(12) United States Patent
Ogata et al.

(10) Patent No.: US 9,991,489 B2
(45) Date of Patent: Jun. 5, 2018

(54) POROUS LAYER, LAMINATED BODY, NONAQUEOUS ELECTROLYTE SECONDARY BATTERY MEMBER INCLUDING THE POROUS LAYER, AND NONAQUEOUS ELECTROLYTE SECONDARY BATTERY INCLUDING THE POROUS LAYER

(71) Applicant: Sumitomo Chemical Company, Limited, Tokyo (JP)

(72) Inventors: Toshihiko Ogata, Osaka (JP); Chikara Murakami, Osaka (JP)

(73) Assignee: SUMITOMO CHEMICAL COMPANY, LIMITED, Tokyo (JP)

(*) Notice: Subject to any disclaimer, the term of this patent is extended or adjusted under 35 U.S.C. 154(b) by 65 days.

(21) Appl. No.: 15/281,282

(22) Filed: Sep. 30, 2016

(65) Prior Publication Data

US 2017/0098809 A1    Apr. 6, 2017

(30) Foreign Application Priority Data

Oct. 2, 2015 (JP) ................... 2015-197122
Feb. 10, 2016 (JP) ................... 2016-024163

(51) Int. Cl.
  *H01M 2/16*  (2006.01)
  *H01M 10/0525*  (2010.01)
  *C08J 7/04*  (2006.01)

(52) U.S. Cl.
  CPC ........... *H01M 2/1653* (2013.01); *C08J 7/047* (2013.01); *H01M 2/1686* (2013.01); *H01M 10/0525* (2013.01); *C08J 2323/06* (2013.01); *C08J 2427/16* (2013.01); *H01M 2220/30* (2013.01)

(58) Field of Classification Search
  CPC ............. H01M 2/1653; H01M 2/1686; H01M 10/052; H01M 10/0525; H01M 2220/30; C08J 7/047; C08J 2323/06; C08J 2427/16
  See application file for complete search history.

(56) References Cited

U.S. PATENT DOCUMENTS

| | | | | |
|---|---|---|---|---|
| 3,931,446 | A * | 1/1976 | Murayama | B29C 71/0063 427/100 |
| 7,208,555 | B2 * | 4/2007 | Tada | C08F 6/14 156/182 |
| 8,931,647 | B2 * | 1/2015 | Shiki | B01D 67/0011 210/500.23 |
| 2006/0014912 | A1 | 1/2006 | Araki et al. | |
| 2007/0190334 | A1 | 8/2007 | Araki et al. | |
| 2009/0101600 | A1 | 4/2009 | Shiki et al. | |
| 2009/0148659 | A1 | 6/2009 | Ishiodori et al. | |
| 2010/0285341 | A1 | 11/2010 | Yun et al. | |
| 2013/0089770 | A1 | 4/2013 | Nishikawa | |
| 2013/0095365 | A1 | 4/2013 | Nishikawa | |
| 2014/0272505 | A1 | 9/2014 | Yoon et al. | |

FOREIGN PATENT DOCUMENTS

| | | |
|---|---|---|
| CN | 1933923 A | 3/2007 |
| EP | 0834941 A1 | 4/1998 |
| JP | S5117274 A | 2/1976 |
| JP | H11186844 A | 3/1999 |
| JP | 2005200623 A | 7/2005 |
| JP | 2008062229 A | 3/2008 |
| JP | 5432417 B2 | 3/2014 |
| JP | 5553165 B2 | 7/2014 |
| JP | 2015111461 A | 6/2015 |
| KR | 20090037552 A | 4/2009 |
| KR | 20130031319 A | 3/2013 |
| KR | 20140113186 A | 9/2014 |
| WO | 2007119850 A1 | 10/2007 |
| WO | 2008018181 A1 | 2/2008 |
| WO | 2012137375 A1 | 10/2012 |
| WO | 2016152863 A1 | 9/2016 |

OTHER PUBLICATIONS

Office Action dated Nov. 29, 2016 in JP Application No. 2016-024163.
Office Action dated Dec. 21, 2016 in KR Application No. 10-2016-0077240.
Office Action dated Jul. 29, 2016 in KR Application No. 1020160077240.
Office Action dated Jun. 28, 2016 in JP Application No. 2016024163.
Office Action dated May 16, 2017 in JP Application No. 2017033720.
Office Action dated Apr. 19, 2017 in KR Application No. 10-2016-0077240.
Martins et al, "Electroactive Phases of Poly(Vinylidene Fluoride): Determination, Processing, and Applications," Progress in Polymer Science, vol. 39, pp. 683-706 (2014).
Office Action dated Mar. 28, 2018 in CN Application No. 201610865635.7.

* cited by examiner

*Primary Examiner* — Raymond Alejandro
(74) *Attorney, Agent, or Firm* — Panitch Schwarze Belisario & Nadel LLP

(57) ABSTRACT

The present invention provides, as a porous layer that can be used for a member for a nonaqueous secondary battery having excellent shutdown characteristics, a porous layer including a polyvinylidene fluoride-based resin, wherein, assuming that a sum of individual amounts of crystal form α and crystal form β contained in the polyvinylidene fluoride-based resin is 100 mol %, the amount of crystal form α contained in the polyvinylidene fluoride-based resin is not less than 10 mol % and not more than 65 mol %.

9 Claims, No Drawings

POROUS LAYER, LAMINATED BODY, NONAQUEOUS ELECTROLYTE SECONDARY BATTERY MEMBER INCLUDING THE POROUS LAYER, AND NONAQUEOUS ELECTROLYTE SECONDARY BATTERY INCLUDING THE POROUS LAYER

This nonprovisional application claims priority under 35 U.S.C. § 119 on Patent Application No. 2015-197122 filed in Japan on Oct. 2, 2015 and Patent Application No. 2016-024163 filed in Japan on Feb. 10, 2016, the entire contents of which are hereby incorporated by reference.

TECHNICAL FIELD

The present invention relates to a porous layer, a laminated body, a nonaqueous electrolyte secondary battery member including the porous layer, and a nonaqueous electrolyte secondary battery including the porous layer.

BACKGROUND ART

Nonaqueous electrolyte secondary batteries (hereinafter also referred to as "nonaqueous secondary battery") such as a lithium secondary battery are currently in wide use as batteries for devices such as a personal computer, a mobile telephone, and a portable information terminal.

A device equipped with a lithium ion battery includes multiple electrical protection circuits provided in a battery charger or a battery pack, in order to ensure a normal and safe operation of the battery. For example, if a breakdown or a malfunction, occurs in the protection circuits, the lithium ion battery can be continuously recharged. This can cause oxidative and reductive degradation of an electrolyte on the surfaces of a cathode and an anode both of which generate heat, oxygen release caused by decomposition of a cathode active material, and even deposition of metallic lithium on the anode. This can eventually cause the lithium ion battery to fall into a thermal runaway. There is also a danger that ignition or explosion may occur in the lithium ion battery, depending on the situation.

In order to safely stop a battery before such a dangerous thermal runaway occurs, most lithium ion batteries currently include a porous base material, which serves as a separator, containing polyolefin as a main component, the porous base material having a shutdown function of clogging pores present in the porous base material when a temperature inside the battery is raised due to some defect and reaches approximately 130° to 140° C. Exhibition of the shutdown function at a temperature rise inside the battery stops passage of ions in the separator and thus allows the battery to safely stop.

On the other hand, the porous base material containing polyolefin as a main component is poorly adhered to electrodes. This may cause decrease in battery capacity and decrease in cycle characteristics. With the aim of improving adhesiveness of the porous base material to electrodes, there has been developed a separator in which a porous layer containing a polyvinylidene fluoride-based resin is laminated on at least one surface of the porous base material.

For example, Patent Literature 1 discloses setting a porosity of a porous layer containing a polyvinylidene fluoride-based resin to 30% to 60% and setting an average pore diameter to 1 nm to 100 nm with consideration for adhesion to electrodes and ion permeability.

CITATION LIST

Patent Literature

Patent Literature 1
Japanese Patent No. 5432417 (Publication Date: Mar. 5, 2014)

SUMMARY OF INVENTION

Technical Problem

Unfortunately, the nonaqueous secondary battery separators including the above-described conventional porous layer still have room for improvement in the shutdown function (shutdown characteristics).

Solution to Problem

The inventors of the present invention have studied a polyvinylidene fluoride-based resin-containing porous layer which is a constituent member of a nonaqueous secondary battery and particularly of a nonaqueous secondary battery separator, and have focused attention on crystal forms of the polyvinylidene fluoride-based resin. The inventors have found that setting proportions of crystal form α and crystal form β contained in the polyvinylidene fluoride-based resin to specific ranges allows the porous layer to be used for a constituent member of a nonaqueous secondary battery separator having excellent shutdown characteristics. As a result, the inventors have accomplished the present invention.

In order to solve the above problem, a porous layer in accordance with the present invention is a porous layer including a polyvinylidene fluoride-based resin, wherein, assuming that a sum of individual amounts of crystal form α and crystal form β contained in the polyvinylidene fluoride-based resin is 100 mol %, the amount of crystal form α contained in the polyvinylidene fluoride-based resin is not less than 10 mol % and not more than 65 mol %.

The amount of crystal form α is calculated from an absorption intensity at around 765 $cm^{-1}$ in an IR spectrum of the porous layer, while the amount of crystal form β is calculated from an absorption intensity at around 840 $cm^{-1}$ in the IR spectrum of the porous layer.

The porous layer in accordance with the present invention is preferably such that the polyvinylidene fluoride-based resin is (i) a homopolymer of vinylidene fluoride and/or (ii) a copolymer of vinylidene fluoride and at least one monomer selected from the group consisting of hexafluoropropylene, tetrafluoroethylene, trifluoroethylene, trichloroethylene, and vinyl fluoride. Further, the polyvinylidene fluoride-based resin has a weight-average molecular weight of preferably not less than 300,000 and not more than 3,000,000.

The porous layer in accordance with the present invention preferably includes a filler which accounts for not less than 1% by mass and not more than 30% by mass of a total weight of the porous layer. Further, the filler has a volume average particle size of preferably not less than 0.01 μm and not more than 10 μm.

Further, a laminated body in accordance with the present invention includes: a porous base material containing a polyolefin-based resin as a main component; and a porous layer in accordance with the present invention, the porous layer being laminated on at least one surface of the porous base material.

Still further, a nonaqueous electrolyte secondary battery separator in accordance with the present invention includes: a porous base material containing a polyolefin-based resin as a main component; and a porous layer in accordance with the present invention, the porous layer being laminated on at least one surface of the porous base material.

A member in accordance with the present invention for a nonaqueous electrolyte secondary battery, includes in sequence: a cathode; a porous layer in accordance with the present invention; and an anode.

Further, a nonaqueous electrolyte secondary battery in accordance with the present invention includes a porous layer in accordance with the present invention.

Advantageous Effects of Invention

A porous layer in accordance with the present invention is suitably applicable to a constituent member of a nonaqueous secondary battery separator having excellent shutdown characteristics. Further, a laminated body in accordance with the present invention includes the porous layer and is thus suitably applicable to a nonaqueous secondary battery separator having excellent shutdown characteristics. Still further, a nonaqueous secondary battery separator in accordance with the present invention, a nonaqueous electrolyte secondary battery member in accordance with the present invention, and a nonaqueous electrolyte secondary battery in accordance with the present invention also include the porous layer and thus include a shutdown function.

DESCRIPTION OF EMBODIMENTS

The following description will discuss one embodiment of the present invention. The present invention is, however, not limited to such an embodiment. Further, the present invention is not limited to the description of the arrangements below, but may be altered in various ways by a skilled person within the scope of the claims. Any embodiment based on a proper combination of technical means disclosed in different embodiments is also encompassed in the technical scope of the present invention. In the present specification, any numerical range expressed as "A to B" means "not less than A and not greater than B" unless otherwise stated.

Embodiment 1: Porous Layer

In order to solve the above problem, a porous layer in accordance with Embodiment 1 of the present invention is a porous layer containing a polyvinylidene fluoride-based resin, wherein, assuming that a sum of individual amounts of crystal form α and crystal form β contained in the polyvinylidene fluoride-based resin is 100 mol %, the amount of crystal form α contained in the polyvinylidene fluoride-based resin is not less than 10 mol % and not more than 65 mol %

The amount of crystal form α a is calculated from an absorption intensity at around 765 $cm^{-1}$ in an IR spectrum of the porous layer, while the amount of crystal form β is calculated from an absorption intensity at around 840 $cm^{-1}$ in the IR spectrum of the porous layer.

The porous layer in accordance with the present, invention contains a polyvinylidene fluoride-based resin (PVDF-based resin). The porous layer (i) has inside itself pores connected to one another, and (ii) allows a gas or a liquid to pass therethrough from one surface to the other. Further, in a case where the porous layer in accordance with the present embodiment is used for a constituent member of a nonaqueous secondary battery separator, the porous layer is provided to be an outermost layer of the separator and to be a layer capable of contacting an electrode.

The amount of PVDP-based resin contained in a porous layer in accordance with the present invention is not less than 10% by mass, preferably not less than 30% by mass, more preferably not less than 50% by: mass (up to 100% by mass), with respect to a mass of the porous layer.

Examples of the PVDF-based resin include homopolymers of vinylidene fluoride (i.e., polyvinylidene fluoride); copolymers (e.g., polyvinylidene fluoride copolymer) of vinylidene fluoride and other monomer(s) polymerizable with vinylidene fluoride; and mixtures of these polymers. Examples of the monomer polymerizable with vinylidene fluoride include hexafluoropropylene, tetrafluoroethylene, trifluoroethylene, trichloroethylene, and vinyl fluoride. The present invention can use (i) one kind of monomer or (ii) two or more kinds of monomers selected from above. The PVDF-based resin can be synthesized through emulsion polymerization or suspension polymerization.

The PVDF-based resin contains vinylidene fluoride at a proportion of normally 85 mol % or more, preferably 90 mol % or more, more preferably 95 mol % or more, and further preferably 98 mol % or more. A PVDF-based resin containing vinylidene fluoride at a proportion of 85 mol % or more is more likely to allow the porous layer to achieve a mechanical strength and a heat resistance against a pressure or heat occurred in battery production.

For example, the porous layer preferably contains two kinds of PVDF-based resins (a first resin and a second resin below) that are different from each other in a content of hexafluoropropylene.

The first resin is (i) a vinylidene fluoride-hexafluoropropylene copolymer containing hexafluoropropylene at a proportion of more than 0 mol % and 1.5 mol % or less or (i) a vinylidene fluoride homopolymer (containing hexafluoropropylene at a proportion of 0 mol %).

The second resin is a vinylidene fluoride-hexafluoropropylene copolymer containing hexafluoropropylene at a proportion of more than 1.5 mol %.

The porous layer containing the two kinds of PVDF-based resins is adhered to the electrode more favorably, as compared with a porous layer not containing one of the two kinds of PVDF-based resins. Further, the porous layer containing the two kinds of PVDF-based resins has improved adhesiveness to other layer (e.g., porous base material layer) which is a constituent member of a nonaqueous secondary battery separator, and has a higher peel strength to peel the porous layer from the other layer, as compared with a porous layer not containing one of the two kinds of PVDF-based resins. The first resin and the second resin are preferably mixed at a mixing ratio (mass ratio, first resin:second resin) of 15:85 to 85:15.

The PVDF-based resin has a weight-average molecular weight of preferably 300,000 to 3,000,000. A PVDF-based resin having a weight-average molecular weight of 300,000 or more allows the porous layer to attain a mechanical property with which the porous layer can endure a process for adhering the porous layer to the electrode, thereby allowing the porous layer and the electrode to adhere to each other sufficiently. Meanwhile, a PVDF-based resin having a weight-average molecular weight of 3,000,000 or less does not cause the coating solution, which is to be applied to shape the porous layer, to have a too high viscosity, which allows the coating solution to have excellent shaping easiness. The weight-average molecular weight of the PVDF-based resin is more preferably 300,000 to 2,000,000, and further preferably 500,000 to 1,500,000.

The PVDF-based resin has a fibril diameter of preferably 10 nm to 1000 nm, in terms of the cycle characteristic of a nonaqueous secondary battery containing the porous layer.

The porous layer of the present invention may contain other resin which is not the PVDF-based resin. Examples of the other resin include styrene-butadiene copolymer; homopolymers or copolymers of vinyl nitriles such as acrylonitrile and methacrylonitrile; and polyethers such as polyethylene oxide and polypropylene oxide.

Further, the porous layer of the present invention may contain a filler made of inorganic matter or organic matter. A porous layer containing the filler can improve slidability and/or heat resistance of a separator containing the porous layer. The filler may be an organic filler or an inorganic filler each of which is stable in a nonaqueous electrolyte solution and is electrochemically stable. The filler preferably has a heat-resistant temperature of 150° C. or more to ensure safety of the battery.

Examples of the organic filler include: crosslinked polymethacrylic acid esters such as crosslinked polyacrylic acid, crosslinked polyacrylic acid ester, crosslinked polymethacrylic acid, and crosslinked polymethyl methacrylate; crosslinked high molecule fine particles such as, crosslinked polysilicone, crosslinked polystyrene, crosslinked polydivinyl benzene, a crosslinked product of a styrene-divinylbenzene copolymer, polyimide, a melamine resin, a phenol resin, a benzoguanamine-formaldehyde condensate; and heat-resistant high molecule fine particles such as polysulfone, polyacrylonitrile, polyaramid, polyacetal, and thermoplastic polyimide.

A resin (high molecules) contained in the organic filler may be a mixture, a modified product, a derivative, a copolymer (a random copolymer, an alternating copolymer, a block copolymer, or a graft copolymer), or a crosslinked product of any of the molecules listed above as examples.

Examples of the inorganic filler include metal hydroxides such as aluminum hydroxide, magnesium hydroxide, calcium hydroxide, chromium hydroxide, zirconium hydroxide, nickel hydroxide, and boron hydroxide; metal oxides such as alumina and zirconia; carbonates such as calcium carbonate and magnesium carbonate; sulfates such as barium sulfate and calcium sulfate; clay minerals such as calcium silicate and talc. Among these, the inorganic filler is preferably a metal hydroxide, in terms of achievement of fire retardance and/or electricity removal effects.

The present invention may use (i) only a single filler or (ii) two or more kinds of fillers in combination. Alternatively, the organic filler(s) and the inorganic fillers) may be used in combination.

The filler has a volume average particle size of preferably 0.01 μm to 10 μm, in order to ensure (i) fine adhesion and fine, slidability and (ii) shaping easiness of the laminated body. A lower limit of the volume average particle size is more preferably 0.1 μm or more, whereas an upper limit of the volume average particle size is more preferably 5 μm or less.

The filler is constituted by particles of any shape, which may be a sphere, an ellipse, a plate-shape, a bar-shape, or an irregular shape. In order to prevent a short circuit in the battery, the particles are preferably (i) plate-shaped, particles or (ii) primary particles which are not aggregated.

The filler forms fine bumps on a surface of the porous layer, thereby improving the slidability. A filler constituted by (i) plate-shaped particles or (ii) primary particles which are not aggregated forms finer bumps on the surface of the porous layer, so that the porous layer is adhered to the electrode more favorably.

The porous layer of the present invention contains the filler at a proportion of preferably 1% by mass to 30% by mass with respect to a total amount of the PVDF-based resin and the filler. A porous layer containing the filler at a proportion of 1% or more by mass is likely to exhibit the effect of forming fine bumps on the surface of the porous layer so as to improve the slidability of a separator containing the porous layer. From this viewpoint, the porous layer contains the filler more preferably at a proportion of 3% or more by mass. Meanwhile, a porous layer containing the filler at a proportion of 30% or less by mass allows the porous layer to maintain mechanical strength. With this arrangement, for example, during a process for producing an electrode body by rolling up a stack of (i) the electrode and (ii) a separator containing the porous layer, the separator is hardly cracked and/or the like. From this viewpoint, the porous layer contains the filler at a proportion of more preferably 20% or less by mass, and further preferably 10% or less by mass.

In order to prevent, in a process of slitting the separator, a slit surface of the separator from becoming fibrous, bending, and/or permitting intrusion of scraps occurred as a result of the slitting, the porous layer in accordance with the present, invention, contains the filler that accounts for preferably not less than 1% by mass and more preferably not less than 3% by mass of a sum of individual amounts of the PVDF-based resin and the filler.

In order to ensure adhesion to the electrode and a high energy density, the porous layer of the present invention has, on one surface of the porous base material, an average thickness of preferably 0.5 μm to 10 μm, and more preferably 1 μm to 5 μm.

The porous layer of the present invention is preferably made porous sufficiently, in terms of ion permeability. Specifically, the porous layer of the present invention has a porosity of preferably 30% to 60%. The porous layer of the present invention has an average pore size of 20 nm to 100 nm.

The porous layer of the present invention has a surface roughness, in terms of a ten-point average roughness (Rz), of preferably 0.8 μm to 8.0 μm, more preferably 0.9 μm to 6.0 μm, and further preferably 1.0 μm to 3.0 μm. The ten-point average roughness (Rz) is a value measured by a method according to JIS B 0601-1994 for Rzjis of JIS B 0601-2001). Specifically, "Rz" is a value measured by ET4000 (available from Kosaka Laboratory Ltd.) with a measurement length of 1.25 mm, a measurement rate of 0.1 mm/sec, and a temperature and humidity of 25° C./50% RH.

The porous layer of the present invention has a coefficient of kinetic friction of preferably 0.1 to 0.6, more preferably 0.1 to 0.4, and further preferably 0.1 to 0.3. The coefficient of kinetic friction is a value measured by a method according to JIS K 7125. Specifically, a coefficient of kinetic friction in the present invention is a value measured by Surface Property Tester (available from Heidon).

<Crystal Forms of PVDF-Based Resin>

A PVDF-based resin can have the following three forms of crystal: crystal form α, crystal form β, and crystal form γ. However, in the IR spectrum measurement of a porous layer included in a laminated body of the present invention, a peak characteristic of crystal form α and a peak characteristic of crystal form β can observed, but a peak characteristic of crystal form γ cannot be observed. That is, almost all crystal forms constitute a PVDF-based resin of the porous layer are crystal form α a and crystal form β.

The PVDF-based resin included in the porous layer in accordance with the present invention is such that, assuming that a sum of individual amounts of crystal form α and crystal form β contained in the PVDF-based resin is 100 mol %, the amount of crystal form α contained in the PVDF-based resin is not less than 10 mol % and not more than 65 mol %, preferably not less than 15 mol %, more preferably not less than 20 mol %, and still more preferably not less than 25 mol %. Further, the amount of crystal form α is preferably not more than 60 mol %, more preferably not more than 55 mol %, and still more preferably not more than 45 mol %. In other words, the amount of crystal form α is preferably not less than 10 mol % and not more than 65 mol %, more preferably not less than 15 mol % and not more than 65 mol %, still more preferably not less than 20 mol % and not more than 65 mol %, even more preferably not less than 25 mol % and not more than 65 mol %, further more preferably not less than 25 mol % and not more than 55 mol %, and still further more preferably not less than 25 mol % and not more than 45 mol %, With the crystal form α contained in an amount that falls within any of the above ranges, the porous layer can be used for a constituent member of a nonaqueous secondary battery having excellent shutdown characteristics, particularly as a constituent member of a separator for such a nonaqueous secondary battery. With the crystal form α contained in an amount that falls within any of the above ranges, the porous layer can also be used for a constituent member of a nonaqueous secondary battery having excellent battery storage stability, particularly as a constituent member of a separator for such a nonaqueous secondary battery.

It is considered that the porous layer of the present invention can be used for a constituent member of a nonaqueous secondary battery having excellent shutdown characteristics, for the reason that the porous layer of the present invention contains a good balance of crystal form β, which has a relatively low melting point, and crystal form α, which is relatively excellent in heat resistance, so that crystal form β, clogs pores while crystal form α contributes to the maintenance of the shape of the separator.

It is considered that the porous layer of the present invention can be used for a constituent member of a nonaqueous secondary battery having excellent battery storage stability, for the reason that the porous layer of the present invention is able to favorably function as a protective film of an electrode since the porous layer of the present invention contains a good balance of crystal form which has a relatively high deformability with force, and crystal form α, which is relatively low deformability with force so that crystal form β increases conformability of the separator containing the porous layer at the expansion of an electrode while crystal form α contributes to the maintenance of the shape of the separator. If an electrode (a cathode in particular) is not sufficiently protected by the separator, degradation (oxidative degradation in particular) of an electrolyte at the electrode can occur. This causes a tendency to decrease battery storage stability. Further, since crystal form β has a structure in which a fluorine atom faces outward, it is considered that a porous layer mostly constituted by crystal form β tends to have a high resistance (oxidation resistance in particular) to an electrode (cathode in particular).

A PVDF-based resin having crystal form α is characterized by being constituted by a polymer containing the following FVDP skeleton.

That is, the PVDF skeleton has a TG$\overline{\text{TG}}$-type conformation in which there are two or more consecutive chains of a conformation such that, with respect to a fluorine atom (or a hydrogen atom) bonded to one carbon atom of a main chain present in a molecular chain of the skeleton, a hydrogen atom (or a fluorine atom) bonded to one neighboring carbon atom takes a trans conformation, and a hydrogen atom (or a fluorine atom) bonded to another (opposite) neighboring carbon atom takes a gauche conformation (positioned at an angle of 60°).

The molecular chain is of TGT$\overline{\text{G}}$ type and the dipole moments of C—$F_2$ and C—$H_2$ bonds have respective moieties oriented vertically and horizontally to the molecular chain.

In the IR spectrum of the PVDF-based resin having crystal form α, characteristic peaks (characteristic absorptions) appear at around 1,212 $cm^{-1}$, at around 1,183 $cm^{-1}$, and at around 765 $cm^{-1}$. In powder X-ray diffraction analysis of the PVDF-based resin having crystal form α, characteristic peaks appear at around 2θ=17.7°, at around 2θ=18.3°, and at around 2θ19.9°.

A PVDF-based resin having crystal form β is characterized by being constituted by a, polymer containing the following PVDF skeleton. That is, the PVDF skeleton has a conformation such that a fluorine atom bonded to one of neighboring carbon atoms in one carbon atom of a main chain in the molecular chain of the skeleton and a hydrogen atom bonded to the other neighboring carbon atom take a trans conformation (TT-type conformation), namely, the fluorine atom and hydrogen atom bonded to the neighboring carbon atoms are positioned oppositely at an angle of 180 degrees when viewed from the carbon-carbon bond.

The PVDF-based resin having crystal form β may be such that the PVDF skeleton has a TT-type conformation in its entirety. Alternatively, the PVDF-based resin having crystal form β may be such that the PVDF skeleton has the TT-type conformation in part and has a molecular chain of the TT conformation in at least four consecutive PVDF monomer units. In any cases, the carbon-carbon bond, in which the TT-type conformation constitutes a TT-type trunk chain, has a planar zigzag structure, and the dipole moments of C—$F_2$ and C—$H_2$ bonds have moieties oriented vertically to the molecular chain.

In the IR spectrum, of the PVDF-based resin having crystal form β characteristic peaks (characteristic absorptions) appear at around 1,274 $cm^{-1}$, at around 1,163 $cm^{-1}$, and at around 840 $cm^{-1}$. In powder X-ray diffraction analysis of the PVDF-based resin having crystal form β, characteristic peaks appear at around 2θ=21°.

A PVDF-based resin having crystal form γ is constituted by a polymer containing the following PVDF skeleton. That is, the PVDF skeleton has a conformation such that a TT-type conformation and a TG-type conformation are alternately provided in a consecutive manner. In the IR spectrum of the PVDF-based resin having crystal form γ, characteristic peaks (characteristic absorptions) appear at around 1,235 $cm^{-1}$ and at around 811 $cm^{-1}$. In powder X-ray diffraction analysis of the PVDF-based resin having crystal form γ, characteristic peaks appear at around 2θ=18°.

<Method of Calculating Crystal Form α Content and Crystal Form β Content of PVDF-Based Resin>

Crystal form α content and crystal form β content of a PVDF-based resin can be calculated by, for example, methods described in (i) to (iii) below.

(i) Equation

Law of Beer: $A = \varepsilon bC$ (1)

wherein A represents an absorbance, ε represents a molar extinction, coefficient, b represents an optical path, length, and C represents a concentration.

Assuming that, in the equation (1), $A^\alpha$ is an absorbance at characteristic absorption of crystal form α, $A^\beta$ is an absorbance at a characteristic absorption of crystal form β, $\varepsilon^\alpha$ is a molar extinction coefficient of crystal form α, $\varepsilon^\beta$ is a molar extinction coefficient of crystal form β, $C^\alpha$ is a concentration of crystal form α in a PVDF-based resin, and $C^\beta$ is a concentration of crystal form in a PVDF-based resin, an absorbance proportion between crystal form α and crystal form β is expressed by the following equation.

$$A^\beta/A^\alpha = (\varepsilon^\beta/\varepsilon^\alpha) \times (C^\beta/C^\alpha)$$ (1a)

Assuming that a correction factor $(\varepsilon^\beta/\varepsilon^\alpha)$ of the molar extinction coefficient is $E^{\beta/\alpha}$, a crystal form β content $F(\beta) = (C^\beta/(C^\alpha + C^\beta))$ of a sum of individual amounts of crystal form α and crystal form β is expressed by the following equation (2a).

$$F(\beta) = \{(1/E^{\beta/\alpha}) \times (A^\alpha/A^\beta)\}/\{1 + (1/E^{\beta/\alpha}) \times (A^\alpha/A^\beta)\} = A^\beta/\{(E^{\beta/\alpha} \times A^\alpha) + A^\beta\}$$ (2a)

Therefore, when the correction factor $E^{\beta/\alpha}$ is determined, the crystal form β content F(β) of the PVDF-based resin with respect, to the sum of individual amounts of crystal form α and crystal form β can be calculated from a measured absorbance $A^\alpha$ at the characteristic absorption of crystal form α and a measured absorbance $A^\beta$ at the characteristic absorption of crystal form β. Further, a crystal form α content F(α) of the PVDF-based resin with respect to the sum of individual amounts of crystal form α and crystal form β can be calculated from the result F(β).

(ii) Method of Determining Correction Factor $E^{\beta/\alpha}$

A sample PVDF-based resin such that a crystal form β content F(β) of the PVDF-based resin is known is prepared by mixing a sample PVDF-based resin having only crystal form α and a sample PVDF-based resin having only crystal form β, and is subjected to IR spectrum measurement. In the IR spectrum, thus obtained, absorbance (peak height) $A^\alpha$ at the characteristic absorption of crystal form α and absorbance (peak height) $A^\beta$ at the characteristic absorption of crystal form β are measured.

Subsequently, by substituting $A^\beta$ and $A^\alpha$ in the equation (3a) below, into which the equation (2a) is rewritten with regard to $E^{\beta/\alpha}$, a correction factor $E^{\beta/\alpha}$ is obtained.

$$E^{\beta/\alpha} = \{A^\beta \times (1 - F(\beta))\}/(A^\alpha \times F(\beta))$$ (3a)

A plurality of samples having different mixture ratios are subjected to IR spectrum measurements. Subsequently, respective correction factors of the samples are obtained by the above method, and an average correction factor $E^{\beta/\alpha}$ of the samples is then calculated.

(iii) Calculation of Crystal Form α Content and Crystal Form β Content of the Sample Based on the average correction factor $E^{\beta/\alpha}$ calculated in (ii) above and a result of the IR spectrum measurement of each sample PVDF-based resin, crystal form α content F(α) of each sample PVDF-based resin with respect, to a sum of individual amounts of crystal form α and crystal form β is calculated.

Specifically, a laminated body containing the porous layer is prepared by a preparation method described below, and a piece of the laminated body is then cut out to prepare a sample for measurement. Thereafter, by using a FT-IR spectrometer (manufactured by Bruker Optics K.K., Model: ALPHA Platinum-ATR), an infrared absorption spectrum of the sample at wave numbers ranging from 4000 cm$^{-1}$ to 400 cm$^{-1}$, which are a measurement range, is measured at room temperature (approximately 25° C.), with a resolution of 4 cm$^{-1}$ and 512 times of scanning. The obtained sample for measurement is preferably in the shape of a square measuring 80 mm per side. The sample for measurement may have any size and any shape, provided that it is large enough for the infrared absorption measurement. Then, from the obtained spectrum are obtained an absorption intensity ($A^\alpha$) at 765 cm$^{-1}$, which is a characteristic absorption of crystal form α, and an absorption intensity ($A^\beta$) at 840 cm$^{-1}$, which is a characteristic absorption band of crystal form β. A starting point and an end point of a waveform formed with the wave number set as a peak are connected with a straight line. Let a length between the straight line and the peak wave number (peak top) denote an absorption intensity. For crystal form α, a maximum value of possible absorption intensities at a wave number in a range from 775 cm$^{-1}$ to 745 cm$^{-1}$ is assumed to be an absorption intensity ($A^\alpha$) at 765 cm$^{-1}$ absorption intensity of crystal form α). For crystal form β, a maximum value of possible absorption intensities at a wave number in a range from 850 cm$^{-1}$ to 815 cm$^{-1}$ is assumed to be an absorption intensity ($A^\beta$) at 840 cm$^{-1}$ (absorption intensity of crystal form β). Note that the crystal form α content F(α) (%) herein is calculated with the average correction factor $E^{\beta/\alpha}$ of 1,681 (with reference to the description in Japanese Patent Application Publication Tokukai No. 2005-200623). An equation for that calculation is expressed by the following equation (4a).

$$F(\alpha)\ (\%) = [1 - \{\text{absorption intensity } (A^\beta) \text{ at } 840 \text{ cm}^{-1}/(\text{absorption intensity } (A^\alpha) \text{ at } 765 \text{ cm}^{-1} \times \text{correction factor } (E^{\beta/\alpha})\ (1.681) + \text{absorption intensity } (A^\beta) \text{ at } 840 \text{ cm}^{-1})\}] \times 100$$ (4a)

[Method of Producing Porous Layer]

A porous layer in accordance with the present invention can be produced by, for example, a method similar to a method of producing a laminated body in accordance with the present invention and a nonaqueous secondary battery separator in accordance with the present invention, which method will be described later.

Embodiments 2 and 3: Laminated Body and Nonaqueous Electrolyte Secondary Battery Separator The following description will discuss, as Embodiments 2 and 3 of the present invention, a laminated body in accordance with the present invention and a nonaqueous electrolyte secondary battery separator (also referred to as nonaqueous secondary battery separator) in accordance with the present invention.

The laminated body in accordance with the present invention includes: a porous base material containing a polyolefin-based resin as a main component; and the porous layer in accordance with Embodiment 1 of the present invention laminated on at least one surface of the porous base material. The nonaqueous secondary battery separator in accordance with the present invention includes: a porous base material containing a polyolefin-based resin as a main component; and the porous layer in accordance with Embodiment 1 of the present invention laminated on at least one surface of the porous base material.

The following description will discuss a porous base material included in the laminated body in accordance with the present invention and in the nonaqueous secondary battery separator in accordance with the present invention and (ii) a method of producing the laminated body in accordance with the present invention and the nonaqueous secondary battery separator in accordance with the present invention.

<Porous Base Material>

A porous base material used in the laminated body of the present invention or in the nonaqueous secondary battery separator of the present invention only needs to be made of a porous and filmy base material containing a poly olefin as a main component (a poly olefin-based porous base material), and is preferably a microporous film. Namely, the porous base material is preferably a porous film that (i) contains a polyolefin as a main component, (ii) has inside itself pores connected to one another, and (iii) allows a gas, a liquid, or the like to pass therethrough from one surface to the other. The porous base material can be formed of a single layer or a plurality of layers.

The porous base material contains a polyolefin component at a proportion of normally 50% or more by volume with respect to whole components contained in the porous base material. Such a proportion of the polyolefin component is preferably 90% or more by volume, and more preferably 95% or more by volume. The porous base material preferably contains, as the polyolefin component, a high molecular weight component having a weight-average molecular weight of $5 \times 10^5$ to $15 \times 10^6$. The porous base material particularly preferably contains, as the polyolefin component, a polyolefin component having a weight-average molecular weight of 1,000,000 or more. This is because that (i) a porous base material containing such a polyolefin component and (ii) the whole of a laminated body and a nonaqueous secondary battery each including such a porous base material achieve higher strength.

Examples of the polyolefin include high molecular weight homopolymers or copolymers produced through polymerization of ethylene, propylene, 1-butene, 4-methyl-1-pentene, 1-hexene, and/or the like. The porous base material can be a layer containing only one of these polyolefins and/or a layer containing two or more of these poly olefins. Among these, a high molecular weight polyethylene containing ethylene as a main component is particularly preferable. Note that the porous base material can contain other component which is not a polyolefin, as long as the other component does not impair the function of the porous base material.

The porous base material has an air permeability normally in a range of 30 sec/100 cc to 500 sec/100 cc, and preferably in a range of 50 sec/100 cc to 300 sec/100 cc, in terms of Gurley values. A porous base material having an air permeability within such a range allows a separator in which the porous base material is used as a constituent member of the separator to obtain sufficient ion permeability.

A thickness of the porous base material is selected as appropriate in view of the number of layers in the laminated body or in the nonaqueous secondary battery. Particularly in a case where the porous layer is formed on one surface (or both surfaces) of the porous base material, the porous base material has a thickness preferably in a range of 4 µm to 40 µm, and more preferably in a range of 7 µm to 30 µm.

The porous base material has a weight normally in a range of 4 g/m² to 20 g/m², and preferably in a range of 5 g/m² to 12 g/m². This is because a porous base material having such a weight is possible to provide suitable strength, thickness, handling easiness, and weight of the laminated body and is also possible to enhance a weight energy density and/or a volume energy density in a case where the porous base material is used as a constituent member of a nonaqueous secondary battery separator.

Suitable examples of such a porous base material include a porous polyolefin layer disclosed in Japanese Patent Application Publication, Tokukai, No. 2013-14017 A, a polyolefin porous film disclosed in Japanese Patent Application Publication, Tokukai, No. 2012-54229 A, and a polyolefin base material porous film disclosed in Japanese Patent Application Publication, Tokukai, No. 2014-040580 A.

The porous base material may be produced through any publicly-known technique, and is not particularly limited to any specific method. For example, as disclosed in Japanese Patent Application Publication, Tokukaihei, No. 7-29563 A (1995), the porous base material may be produced through a method of (i) adding a plasticizing agent to a thermoplastic resin to shape the thermoplastic resin into a film and then (ii) removing the plasticizing agent with use of an appropriate solvent.

Specifically, in a case of, for example, producing a porous base material with use of a polyolefin resin containing (i) an ultra high molecular weight polyethylene and (ii) a low molecular weight polyolefin having a weight-average molecular weight of 10,000 or less, such a porous base material is, in terms of production cost, preferably produced through the method including the following steps (1) to (4):

(1) a step of kneading (i) 100 parts by weight of the ultra high molecular weight polyethylene, (ii) 5 to 200 parts by weight of the low molecular weight polyolefin having a weight-average molecular weight of 10,000 or less, and (iii) 100 to 400 parts by weight of an inorganic filler of calcium carbonate or the like to produce a polyolefin resin composition, (2) a step of shaping the polyolefin resin composition into a sheet, (3) a step of removing the inorganic filler from the sheet produced in the step (2), and (4) a step of drawing the sheet produced in the step (3).

Alternatively, the porous base material may be produced through any of the methods explained in the above-described Patent Literatures.

The porous base material may alternatively be a commercially available product having the above physical properties.

It is more preferable that the porous base material be subjected to a hydrophilization treatment before a porous layer is formed thereon, that is, before a coating solution described below is applied thereto. Performing a hydrophilization treatment on the porous base material further improves the coating easiness of the coating solution and thus allows a more uniform porous layer to be formed. This hydrophilization treatment is effective in a case where the solvent (disperse medium) contained in the coating solution has a high proportion of water. Specific examples of the hydrophilization treatment include publicly known treatments such as (i) a chemical treatment involving an acid, an alkali, or the like, (ii) a corona treatment, and (iii) a plasma treatment. Among these hydrophilization treatments, a corona treatment is preferable because it can not only hydrophilize the porous base material within a relatively short time period, but also hydrophilize only a surface and its vicinity of the porous base material to leave the inside of the porous base material unchanged in quality.

The porous base material may include, as necessary, a porous layer other than the porous layer in accordance with Embodiment 1 of the present invention. Examples of the other porous layer include publicly known porous layers such as a heat-resistant layer, an adhesive layer, and a protective layer. Specific examples of the other porous layer include a, porous layer identical in composition to the porous layer in accordance with Embodiment 1 of the present invention.

<Shutdown Characteristic>

Examples of a method of measuring shutdown characteristics of the laminated body include a method provided below. By a method similar to that method, shutdown characteristics of the nonaqueous secondary battery separator can be measured.

A circular measurement sample having a diameter of 19.4 mm is cut out from a laminated body (deposited porous film) is prepared as a measurement sample. Further, members of a 2032-type coin cell fan upper case, a lower case, a ring gasket, a Kapton window (external diameter 16.4 mm; internal diameter 8 mm; thickness 0.05 mm), a spacer (circular spacer with a diameter of 15.5 mm and a thickness of 0.5 mm), and an aluminum ring (external diameter 16 mm; internal diameter 10 mm; thickness 1.6 mm)) (manufactured by Hohsen Corporation) are prepared.

Subsequently, the lower case, the measurement sample, and the ring gasket are stacked on top of each other in this order, and the measurement sample is then impregnated with 10 μmL of electrolyte. Thereafter, the Kapton window, the spacer, the aluminum ring, and the upper case are stacked on top of the measurement sample in this order, and the stacked members are then hermetically sealed by a coin cell crimping machine (manufactured by Hohsen Corporation) to obtain a coin cell for measurement. Here, the electrolyte as used is an electrolyte (in $LiBF_4$ concentration of 1.0 mol/L) at 25° C. obtained by dissolving $LiBF_4$ into a mixed solvent of propylene carbonate and NIKKOLBT-12 (manufactured by Nikko Chemicals Co., Ltd.) in a volume ratio of 9.1.5: 8.5.

While a temperature of the inside of the coin cell for measurement is raised at a rate of 15° C. per minute starting from room temperature up to 150° C. the temperature of the inside of the coin cell is continuously measured by a digital multimeter (manufactured by ADC Corporation; 7352A), and a resistance value of the coin cell at 1 kHz is continuously measured by an LCR meter (manufactured by HIOKI E. E. Corporation; IM3523).

During the measurement, a coin cell having a resistance value of 5000Ω or higher at 1 kHz is determined to have a shutdown function.

The above-described measurement is performed on a plurality of coin cells produced using each laminated body. Then, a percentage of coin, cells having been determined to have a shutdown function is calculated for each laminated body. Based on a result of the calculation, evaluation of shutdown characteristics is made.

<Method of Producing Laminated Body and Nonaqueous Secondary Battery Separator>

A method of producing the laminated body and the nonaqueous secondary battery separator in accordance with Embodiments 2 and 3 of the present, invention is not particularly limited to any specific method and can be selected from various methods.

The laminated body and the nonaqueous secondary battery separator are produced by depositing, on a surface of a polyolefin-based resin fine porous film as a porous base material, a porous layer containing a PVDF-based resin by, for example, any one of steps (1) to (3) below. The steps (1) and (2) further involve drying an obtained porous layer to remove the solvent.

(1) Step of (i) applying to a surface of the porous base material a coating solution in which a PVDF-based resin for forming a porous layer is dissolved and then (ii) immersing the porous base material into a deposition solvent as a poor solvent for the PVDF-based resin to deposit a porous layer containing the PVDF-based resin (2) Step of (i) applying to a surface of the porous base material a coating solution in which a PVDF-based resin for forming a porous layer is dissolved and then (ii) making the coating solution acidic with use of low-boiling organic acid to deposit a porous layer containing the PVDF-based resin (3) Step of (i) applying to a surface of the porous base material a coating solution in which a PVDF-based resin for forming a porous layer is dissolved and then (ii) evaporating the solvent in the coating solution by far infrared heating or freeze drying to deposit a porous layer containing the PVDF-based resin The solvent (disperse medium) used in the coating solution may be any solvent that does not adversely influence the porous base material, that allows the PVDF-based resin to be dissolved uniformly and stably, and that allows the filler to be dispersed uniformly and stably. For example, N-methyl-pyrrolidone is more preferably used as the solvent (disperse medium).

The deposition solvent can be, for example, a solvent (hereinafter referred to as "solvent X") other than the solvent (disperse medium) contained in the coating solution which solvent X is dissolvable in the solvent (disperse medium) in the coating solution and which solvent X does not dissolve the PVDF-based resin contained in the coating solution. The solvent (disperse medium) may be efficiently removed from the coating solution by (i) immersing into the solvent X a porous base material to which the coating solution has been applied to form a coating film, (ii) substituting the solvent X for the solvent (disperse medium) in the coating film on the porous base material or a support, and then (iii) evaporating the solvent X. For example, isopropyl alcohol of t-butyl alcohol is preferably used as the deposition solvent.

In the step (2), the low-boiling organic acid is, for example, paratoluene sulfonic acid, acetic acid, etc.

In the step (3), far infrared heating and freeze drying are advantageous over other drying methods (such as air drying) in that the respective shapes of holes in the porous layer are not easily changeable during the deposition.

Another method of producing the laminated body of the present invention includes a method including the step (4) below.

(4) Step of (i) applying to a porous base material a coating solution containing a disperse medium such as water and fine particles of the PVDF-based resin for forming a porous layer which fine particles are dispersed in the disperse medium and (ii) drying the disperse medium for removal to form a porous layer In the step (4), the disperse medium is preferably water. Further, the laminated body before the drying may be immersed in a lower alcohol to dilute or substitute the disperse medium such as water with the lower alcohol. In this case, the lower alcohol is preferably isopropyl alcohol or t-butyl alcohol.

An applied amount of the porous layer is, on one surface of the porous base material, preferably 0.5 $g/m^2$ to 1.5 $g/m^2$ in terms of adhesion to the electrode and ion permeability. That is, it is preferable to control the amount of the coating solution to be applied onto the porous base material so that the applied amount of the porous layer in the obtained laminated body and in the obtained nonaqueous secondary battery separator falls within the above range.

In a case of producing a laminated body further including a heat-resistant layer, such a heat-resistant layer may be deposited through a method similar to the above method except that the resin for forming a porous layer is replaced with a resin for forming a heat-resistant layer.

To form a porous layer containing a filler, the filler may be dispersed in the solution in which the resin for forming the porous layer is dissolved.

In the present embodiment, in any of the steps (1) to (3), by varying an amount of resin in the solution in which the resin for forming the porous layer is dissolved, it is possible to adjust a volume of resin having absorbed the electrolyte solution per square meter of the porous layer after being immersed in the electrolyte solution.

Furthermore, by varying an amount of the solvent in which the resin for forming the porous layer is dissolved, it is possible to adjust a porosity and an average pore diameter of the porous layer after being immersed in the electrolyte solution.

<Method of Controlling Crystal Forms of PVDF-Based Resin>

The laminated body of the present invention and the nonaqueous secondary battery separator of the present invention are produced in such a manner that a drying temperature and a deposition temperature in the above-described method (a deposition temperature at which deposition of a porous layer containing a PVDF-based resin is performed using a deposition solvent or a low-boiling organic acid) are adjusted to control crystal forms of the PVDF-based resin contained in the obtained porous layer. Specifically, the laminated body of the present invention and the nonaqueous secondary battery separator of the present invention are produced in such a manner that, the drying temperature and the deposition temperature are adjusted so that, assuming that a sum of individual amounts of crystal form α and crystal form β contained in the PVDF-based resin is 100 mol %, the amount of crystal form α contained in the PVDF-based resin is not less than 10 mol % and not more than 65 mol %.

A drying temperature and a deposition temperature for attaining the PVDF-based resin in which, assuming that a sum of individual amounts of crystal form α and crystal form β contained in the PVDF-based resin is 100 mol %, the amount of crystal form α contained in the PVDF-based resin is not less than 10 mol % and not more than 65 mol % can be changed as appropriate according to a method of producing the porous layer, a solvent (disperse medium) as used, types of deposition solvent and low-boiling organic acid, and other conditions. For example, in a case where a porous layer is formed through the above-described step (1) with use of (i) N-methylpyrrolidone as a solvent in which the PVDF-based resin is dissolved and (ii) isopropyl alcohol as a deposition solvent, it is preferable that, the deposition temperature be in a range from −30° C. to 10° C., and that the drying temperature be 30° C.

Embodiments 4 and 5: Nonaqueous Secondary Battery Member and Nonaqueous Secondary Battery The following description will discuss a nonaqueous secondary battery member and a nonaqueous secondary battery as Embodiments 4 and 5 of the present invention. A nonaqueous secondary battery member of the present invention is such that a cathode, the porous layer in accordance with Embodiment 1 of the present invention, and an anode are provided in this order. A nonaqueous secondary battery of the present invention includes the porous layer in accordance with Embodiment 1 of the present invention. The nonaqueous secondary battery of the present invention is, for example, a lithium ion secondary battery that achieves an electromotive force through doping and dedoping with lithium and includes a nonaqueous secondary battery member in which a cathode, the porous layer of the present invention, a porous base material, and an anode are laminated in this order. The description below deals with a lithium ion secondary battery as an example of the nonaqueous electrolyte secondary battery. The constituent elements of the nonaqueous electrolyte secondary battery other than the porous layer are not limited to the constituent elements described below.

The nonaqueous secondary battery of the present invention only needs to include a cathode, an anode, and the porous layer of the present invention, and is not particularly limited in other arrangements. It is preferable that the nonaqueous secondary battery of the present invention further include a porous base material. The nonaqueous secondary battery of the present invention includes (i) a battery element made of a structure (a) including the anode and the cathode facing each other via the above-described laminated body including the porous layer of the present invention and a porous base material and (b) containing the electrolyte solution and (ii) an exterior member including the battery element. The nonaqueous secondary battery is preferably a nonaqueous electrolyte secondary battery, and is particularly preferably a lithium ion secondary battery. Note that the doping means storage, support, absorption, or insertion, and means a phenomenon in which lithium ions enter an active material of the electrode (e.g., the cathode). A nonaqueous secondary battery produced so as to include the above-described laminated body in accordance with the present invention as a nonaqueous secondary battery separator excels in handling easiness of the separator, and thus has a high production yield.

The cathode of the nonaqueous secondary battery can be generally a cathode sheet with a structure such that an active material layer containing a cathode active material and a binder resin is formed on a current collector. The active material layer may further include a conductive auxiliary agent.

Examples of the cathode active material include a lithium-containing transition metal oxide, specific examples of which include $LiCoO_2$, $LiNiO_2$, $LiMm_{1/2}Ni_{1/2}O_2$, $LiCo_{1/3}Mn_{1/3}Ni_{1/3}O_2$, $LiMn_2O_4$, $LiFePO_4$, $LiCo_{1/2}Ni_{1/2}O_2$, and $LiAl_{1/4}Ni_{3/4}O_2$.

Examples of the binder resin in the cathode include a PVDF-based resin.

Examples of the conductive auxiliary agent include carbon materials such as acetylene black, Ketjenblack, and graphite powder.

Examples of the current collector in the cathode include aluminum foil, titanium foil, and stainless steel foil each having a thickness of 5 μm to 20 μm.

The anode of the nonaqueous secondary battery can be an anode sheet with a structure such that an active material layer containing an anode active material and a hinder resin is formed on a current collector. The active material layer may further include a conductive auxiliary agent.

Examples of the anode active material include a material capable of electrochemical storage of lithium. Specific examples of such a material include a carbon material; and an alloy of (i) lithium and (ii) silicon, tin, aluminum, or the like.

Examples of the binder resin in the anode include a PVDF-based resin and styrene-butadiene rubber. The nonaqueous secondary battery of the present invention is able to ensure sufficient adhesion to the anode even if the anode includes styrene-butadiene rubber as the anode binder.

Examples of the conductive auxiliary agent in the anode include carbon materials such as acetylene black, Ketjenblack, and graphite powder.

Examples of the current collector in the anode include copper foil, nickel foil, and stainless steel foil each having a thickness of 5 μm to 20 μm. Instead of the anode described above, metallic lithium foil may be employed as the anode.

The electrolyte solution is a solution made of a nonaqueous solvent in which a lithium salt is dissolved. Examples of the lithium salt include $LiPF_6$, $LiBF_4$, and $LiClO_4$.

Examples of the nonaqueous solvent include all solvents generally used in a nonaqueous secondary battery, and are not limited to, for example, a mixed solvent (ethyl methyl carbonate, diethyl carbonate, and ethylene carbonate in volume ratio of 50:20:30).

Examples of the nonaqueous solvent include cyclic carbonate such as ethylene carbonate, propylene carbonate, fluoroethylene carbonate, and difluoroethylene carbonate; chain carbonate such as dimethyl carbonate, diethyl carbonate, ethyl methyl carbonate, and fluorine substituents thereof; and cyclic ester such as γ-butyrolactone and γ-valerolactone. The present invention may use only (i) one kind of solvent or (ii) two or more kinds of solvents in combination selected from the above.

The electrolyte solution is preferably the one obtained by (i) preparing a mixture through mixing of cyclic carbonate and chain carbonate at a volume ratio (cyclic carbonate/chain carbonate) of 20/80 to 40/60 (more preferably 30/70) and (ii) dissolving in the mixture a lithium salt at a concentration of 0.5M to 1.5M.

Examples of the exterior member include a metal can and a pack which is made of an aluminum-laminated film. Examples of the shape of the battery include a square, a rectangular, a cylinder, a coin shape.

It is possible to produce the nonaqueous secondary battery by, for example, (i) causing the electrolyte solution to permeate a nonaqueous secondary battery member including the cathode sheet, the anode sheet, and the above-described laminated body which is disposed, as a separator, between the cathode sheet and the anode sheet, (ii) causing the nonaqueous secondary battery member to be accommodated in the exterior member (e.g., the pack made of the aluminum-laminated layer film), and (iii) pressing the nonaqueous secondary battery member via the exterior member.

The laminated body in accordance with the present invention serving as a separator can be bonded to the electrode by stacking the laminated body onto the electrode. Thus, although the above pressing is not an essential step for battery production in this case, it is preferable to perform the pressing in order to enhance adhesion between the electrode and the laminated body in accordance with the present invention serving as a separator. It is preferable to perform the pressing while the separator and the electrode are heated (hot pressing) in order to further enhance adhesion between the electrode and the laminated body in accordance with the present invention serving as a separator.

A manner how the laminated body in accordance with the present invention serving as a separator is disposed between the cathode sheet and the anode sheet may be (i) a manner (so-called stack system) in which at least one cathode sheet, at least one laminated body in accordance with the present invention serving as a separator, and at least one anode sheet are stacked in this order or (ii) a manner in which a cathode sheet, a laminated body in accordance with the present invention serving as a separator, an anode sheet, and a laminated body in accordance with the present, invention serving as a separator are stacked in this order and the stack thus obtained is rolled up in a direction along a length of the stack.

Another Embodiment

The above description has dealt with a case where a laminated body in accordance with the present invention serving as a nonaqueous secondary battery separator in which a porous layer is formed on a porous base material is produced, and a cathode sheet and an anode sheet are laminated between which the laminated body in accordance with the present invention serving as a nonaqueous secondary battery separator is sandwiched, so that, a nonaqueous secondary battery member including (i) the laminated body in accordance with the present invention serving as a nonaqueous secondary battery separator and (ii) electrodes is produced. However, the method for producing the nonaqueous secondary battery in accordance with the present invention is not limited to the method employed in that case.

For example, a porous layer may be formed by applying, to at least one surface of a cathode sheet or an anode sheet, a solution in which a PVDF-based resin to be contained in the porous layer is dissolved. This method for forming the porous layer may be a method including one of the above steps (1) to (4). Then, the cathode sheet and the anode sheet are laminated between which a porous base material is sandwiched, and the resulting laminate is thermally pressed, so as to produce a nonaqueous secondary battery member including (i) the laminated body in accordance with the present, invention serving as a nonaqueous secondary battery separator and (ii) electrodes. In this case, the electrode sheet on which the porous layer is formed may be provided so that the porous layer faces the porous base material. This allows producing a nonaqueous secondary battery member in which the electrode, the porous layer, the porous base material, (porous layer), and the electrode are laminated in this order. The nonaqueous secondary battery thus produced can be such that the porous layer is provided between the electrode and the porous base material, the porous layer containing the PVDF-based resin in which, assuming that a sum of individual amounts of crystal form α and crystal form β contained in the PVDF-based resin is 100 mol %, the amount of crystal form α contained in the PVDF-based resin is not less than 10 mol % and not more than 65 mol %.

The nonaqueous secondary battery of the present invention has a shutdown function since if includes, as a separator, the laminated body including (i) the porous base material containing polyolefin as a main component, and (ii) the porous layer being laminated on one or both surfaces of the porous base material and containing the PVDF-based resin in which, assuming that a sum of individual amounts of crystal form α and crystal form β contained in the PVDF-based resin is 100 in the amount of crystal form α contained in the PVDF-based resin is not less than 10 mol % and not more than 65 mol %.

The present invention is not limited to the above-described embodiments, but may be altered in various ways by a skilled person within the scope of the claims. Any embodiment based on a proper combination of technical means disclosed in different embodiments is also encompassed in the technical scope of the present invention.

EXAMPLES

[Shutdown Characteristic Test]
[Measurement Methods]

On the laminated bodies obtained in Examples 1 to 4 and Comparative Examples 1 to 4 below, an α ratio calculation and a shutdown test were performed by methods described below.

(1) α Ratio Calculation Method

An α ratio (%), which is a mole ratio (%) of crystal form α with respect to the sum of the individual amounts of crystal form α and crystal form β in the PVDF-based resin which is contained in the porous layer of the laminated body-obtained in Examples and Comparative Examples below, was measured by the method provided below.

A square piece measuring 80 mm per side was cut out from the laminated body. Thereafter, by using a FT-IR spectrometer (manufactured by Bruker Optics K.K., Model: ALPHA Platinum-ATR), an infrared absorption spectrum of the piece of laminated body at wave numbers ranging from 4000 $cm^{-1}$ to 400 $cm^{-1}$, which are a measurement range, was obtained at room temperature (approximately 25° C.) with a resolution of 4 $cm^{-1}$ and 512 times of scanning. From the obtained spectrum were obtained an absorption intensity at 765 $cm^{-1}$, which is a characteristic absorption of crystal form α, and an absorption intensity at 840 $cm^{-1}$, which is a characteristic absorption of crystal form β. A starting point and an end point of a waveform formed with the wave number set as a peak were connected with a straight line. Let a length between the straight line and the peak wave number (peak top) denote an absorption intensity. For crystal form α, a maximum value of possible absorption intensities at a wave number in a range from 775 $cm^{-1}$ to 745 $cm^{-1}$ was assumed to be an absorption intensity ($A^α$) at 765 $cm^{-1}$ (absorption intensity of crystal form α). For crystal form β, a maximum value of possible absorption intensities at a wave number in a range from 850 $cm^{-1}$ to 815 $cm^{-1}$ was assumed to be an absorption intensity ($A^β$) at 840 $cm^{-1}$ (absorption intensity of crystal form β).

Calculation of the α ratio was made (a) using an absorption intensity at 765 $cm^{-1}$ corresponding to crystal form α and an absorption intensity at 840 $cm^{-1}$ corresponding to crystal form β, which absorption intensities had been determined as described above, and (b) using a numerical value obtained by multiplying the absorption intensity at 765 $cm^{-1}$ by 1.681 with reference to the description in Japanese Patent Application Publication Tokukai No. 2005-200623. That is, the α ratio was calculated by equation (4a) below.

α ratio (%)=[1−{(absorption intensity at 840 $cm^{-1}$/ (absorption intensity at 765 $cm^{-1}$×correction factor (1.681)+absorption intensity at 840 $cm^{-1}$)}]×100     (4a)

(2) Shutdown Test

A circular measurement sample having a diameter of 19.4 mm is cut out from each of the laminated bodies (deposited porous films) obtained in Examples 1 to 4 and Comparative Examples 1 to 4 was prepared as a measurement sample. Further, members of a 2032-type coin cell (an upper case, a lower case, a ring gasket, a Kapton window (external diameter 16.4 mm; internal diameter 8 mm; thickness 0.05 mm), a spacer (circular spacer with a diameter of 15.5 mm and a thickness of 0.5 mm), and an aluminum ring (external diameter 16 mm; internal diameter 10 mm; thickness 1.6 mm)) (manufactured by Hohsen Corporation) were prepared.

Subsequently, the lower case, the measurement sample, and the ring gasket were stacked on top of each other in this order, and the measurement sample is then impregnated with 10 μmL of electrolyte. Thereafter, the Kapton window, the spacer, the aluminum ring, and the upper case were stacked on top of the measurement sample in this order, and the stacked members were then hermetically sealed by a coin cell crimping machine (manufactured by Hohsen Corporation) to obtain a coin cell for measurement. Here, the electrolyte as used was an electrolyte (in $LiBF_4$ concentration of 1.0 mol/L) at 25° C. obtained by dissolving $LiBF_4$ into a mixed solvent of propylene carbonate and NIK-KOLBT-12 (manufactured by Nikko Chemicals Co., Ltd.) in a volume ratio of 91.5:8.5.

While a temperature of the inside of the coin cell for measurement was raised at a rate of 15° C. per minute starting from room temperature up to 150° C., the temperature of the inside of the coin cell was continuously measured by a digital multimeter (manufactured by ADC Corporation; 7352A) and a resistance value of the coin cell at 1 kHz was continuously measured by an LCR meter (manufactured by HIOKI E. E. Corporation; IM3523).

During the measurement, a coin cell having a resistance value of 5000Ω or higher at 1 kHz was determined to have a shutdown function.

The above-described measurement was performed on a plurality of coin cells (three coin cells) produced using each laminated body. Then, a percentage of coin cells having been determined to have a shutdown function was calculated for each laminated body. Evaluation results are shown in Table 1. A laminated body showing that a percentage of coin cells having been determined to have a shutdown function (a rate of shutdown function exhibition) had been not lower than 60% was rated as "G (good)". A laminated body showing that a percentage of coin cells having been determined to have a shutdown function had been not lower than 30% and lower than 60% was rated as "U (unsatisfactory)". A laminated body showing that a percentage of coin cells having been determined to have a shutdown function had been lower than 30% was rated as and "P (poor)".

Example 1

An N-methyl-2-pyrrolidone (hereinafter also referred to as "NMF") solution (manufactured by Kureha Corporation; product, name "L#7305"; weight-average molecular weight of 1,000,000) containing a PVDF-based resin (polyvinylidene fluoride homopolymer) was prepared as a coating solution. The coating solution was applied to a polyethylene porous film (thickness 12 μm, porosity 44%) through a doctor blade method so as to weigh 5.0 g per square meter of PVDF-based resin in the coating solution. An applied material obtained was immersed in 2-propanol while the coating film remained wet with NMP, and then was allowed to stand at −25° C. for 5 minutes, so that a deposited porous film (1-i) was obtained. While the deposited porous film (1-i) thus obtained was in an immersion solvent wet state, the deposited porous film (1-i) was further immersed in another 2-propanol, and then was allowed to stand at 25° C. for 5 minutes, so that a deposited porous film (1-ii) was obtained. The deposited porous film (1-ii) thus obtained was dried at 30° C. for 5 minutes, so that a laminated body (1) was obtained. The evaluation result of the laminated body (1) is shown in Table 1.

Example 2

An applied, material obtained through a method similar to that employed in Example 1 was immersed in 2-propanol while the coating film remained wet with NMP, and then was allowed to stand at −5° C. for 5 minutes, so that a deposited porous film (2-i) was obtained. While the deposited porous film (2-i) thus obtained was in an immersion solvent wet state, the deposited porous film (2-i) was further immersed in another 2-propanol, and then was allowed to stand at 25° C. for 5 minutes, so that a deposited porous film (2-ii) was obtained. The deposited porous film (2-ii) thus obtained was dried at 30° C. for 5 minutes, so that a laminated body (2) was obtained. The evaluation result of the laminated body (2) is shown in Table 1.

Example 3

An NMP solution (manufactured by Kureha Corporation; product name "L#1120"; weight-average molecular weight of 280,000) containing a PVDF-based resin (polyvinylidene fluoride homopolymer) was prepared as a coating solution. The coating solution was applied to a polyethylene porous film (thickness 12 μm, porosity 44%) through a method similar to that employed in Example 1. An applied material obtained was immersed in 2-propanol while the coating film remained wet with NMP, and then was allowed to stand at −5° C. for 5 minutes through a method similar to that employed in Example 1, so that a deposited porous film (3-i) was obtained. While the deposited porous film (3-i) thus obtained was in an immersion solvent wet, state, the deposited porous film (3-i) was further immersed in another 2-propanol, and then was allowed to stand at 25° C. for 5 minutes, so that a deposited porous film (3-ii) was obtained. The deposited porous film (3-ii) thus obtained was dried at 30° C. for 5 minutes, so that a laminated body (3) including a porous layer was obtained. The evaluation result of the laminated body (3) is shown in Table 1.

Example 4

An NMP solution (manufactured by Kureha Corporation; product name "L#9305"; weight-average molecular weight of 1,000,000) containing a PVDF-based resin (polyvinylidene fluoride-hexafluoropropylene copolymer) was prepared as a coating solution. The coating solution was applied to a polyethylene porous film (thickness 12 μm, porosity 44%) through a method similar to that employed in Example 1. An applied material obtained was immersed in 2-propanol while the coating film remained wet with NMP, and then wets allowed to stand at 10° C. for 5 minutes, so that a deposited porous film (4-i) was obtained. While the deposited porous film (4-i) thus obtained was in an immersion solvent wet state, the deposited porous film (4-i) was further immersed in another 2-propanol, and then was allowed to stand at 25° C. for 5 minutes, so that a deposited porous film (4-ii) was obtained. The deposited porous film (4-ii) thus obtained was dried at 30° C. for 5 minutes, so that a laminated body (4) including a porous layer was obtained. The evaluation result of the laminated body (4) is shown in Table 1.

Comparative Example 1

An applied material obtained through a method similar to that employed in Example 3 was immersed in 2-propanol while the coating film remained wet with NMP, and then was allowed to stand at 0° C. for 5 minutes, so that a deposited porous film (5-i) was obtained. While the deposited porous film (5-i) thus obtained was in an immersion solvent wet state, the deposited porous film (5-i) was further immersed in another 2-propanol, and then was allowed to stand at 25° C. for 5 minutes, so that a deposited porous film (5-ii) was obtained. The deposited porous film (5-ii) thus obtained was dried at 65° C. for 5 minutes, so that a laminated body (5) was obtained. The evaluation result of the laminated body (5) is shown in Table 1.

Comparative Example 2

In a mixed solvent of dimethylacetamide and tripropylene glycol mixed at a mass ratio of 7/3, a PVDF-based resin (polyvinylidene fluoride-hexafluoropropylene copolymer; manufactured by Kureha Corporation; product name "W#9300"; weight-average molecular weight of 1,000,000) was stirred and dissolved at 65° C. for 30 minutes so that a solid content was 5% by mass. A resultant solution was applied as a coating solution to a polyethylene porous film (thickness 12 μm, porosity 44%) through a doctor blade method so as to weigh 5.0 g per square meter of the PVDF-based resin in the coating solution. An applied material obtained was immersed, while the coating film remained wet with NMP, in a mixture of water, dimethylacetamide, and tripropylene glycol mixed at a mass ratio of 57/30/13, and then was allowed to stand at 40° C. for 5 minutes, so that a deposited porous film (6-i) was obtained.

The deposited porous film (6-i) thus obtained was washed with water, so that a deposited porous film (6-ii) was obtained. The deposited porous film (6-ii) thus obtained was dried at 85° C. for 3 minutes, so that a laminated body (6) including a porous layer was obtained. The evaluation result of the laminated body (6) is shown in Table 1.

Comparative Example 3

An applied material obtained through a method similar to that employed in Example 3 was immersed in 2-propanol cooled with dry ice while the coating film remained wet with NMP, and then was allowed to stand at 25° C. for 5 minutes, so that a deposited porous film (7-i) was obtained. While the deposited porous film (7-i) thus obtained was in an immersion solvent wet state, the deposited porous film (7-i) was further immersed in another 2-propanol, and then was allowed to stand at 25° C. for 5 minutes, so that a deposited porous film (7-ii) was obtained. The deposited porous film (7-ii) thus obtained was dried at 30° C. for 5 minutes, so that a laminated body (7) was obtained. The evaluation result of the laminated body (7) is shown in Table 1.

Comparative Example 4

An applied material obtained through a method similar to that employed in Example 3 was immersed in 2-propanol cooled with dry ice while the coating film remained wet with NMP, and then was allowed to stand at 25° C. for 5 minutes, so that a deposited porous film (8-i) was obtained. While the deposited porous film (8-i) thus obtained was in an immersion solvent wet state, the deposited porous film (8-i) was further immersed in another 2-propanol, and then was allowed to stand at 25° C. for 5 minutes, so that a deposited porous film (8-ii) was obtained. The deposited porous film (8-ii) thus obtained was dried at 65° C. for 5 minutes, so that a laminated body (8) was obtained. The evaluation result of the laminated body (8) is shown in Table 1.

TABLE 1

|  | α ratio [mol %] | Rate of shutdown function exhibition [%] | Evaluation of shutdown function exhibition |
|---|---|---|---|
| Example 1 | 13 | 100 | G |
| Example 2 | 41 | 67 | G |
| Example 3 | 48 | 67 | G |
| Example 4 | 63 | 100 | G |
| Comparative Example 1 | 69 | 33 | U |
| Comparative Example 2 | 69 | 33 | U |
| Comparative Example 3 | 89 | 33 | U |
| Comparative Example 4 | 97 | 0 | P |

[Result]

It was shown that 60% or more of coin cells (nonaqueous secondary batteries) which, include, as a separator, each of the laminated bodies (1) to (4) produced in Examples 1 to 4, respectively, wherein a porous layer included in each of the laminated bodies contains a PVDF-based resin including crystal form α and crystal form and having a crystal form α content (α ratio) of not less than 10 mol % and not more than 65 mol %, have a shutdown function.

On the other hand, it was shown that less than 60% of coin cells (nonaqueous secondary batteries) which include, as a separator, each of the laminated bodies (5) to (8) produced in Comparative Examples 1 to 4, respectively, wherein a porous layer included in each of the laminated bodies contains a PVDF-based resin including crystal form α and crystal form β and having a crystal form α content (α ratio) of lower than 10 mol % and higher than 65 mol %, have a shutdown function. As a result, it was shown that the coin cells including the laminated bodies (5) to (8) produced in Comparative Examples 1 to 4, respectively, exhibit shutdown characteristics at a lower percentage than the coin cells including the laminated bodies (1) to (4) obtained in Examples 1 to 4, respectively.

Therefore, it was shown that a laminated body that includes a porous layer containing a PVDF-based resin including crystal form α and crystal form β, wherein a crystal form α content (α ratio) of the PVDF-based resin is not less than 10 mol % and not more than 65 mol %, is preferable as a separator in a coin cell (nonaqueous secondary battery) having a shutdown function.

[Battery Storage Stability Test]

Next, a nonaqueous secondary battery was produced by a production method provided below. Then, battery storage stability measurements were performed on the produced nonaqueous secondary batteries by a battery storage stability test method provided below.

[Method of Producing Nonaqueous Electrolyte Secondary Battery and Battery Storage Stability Test Method]

<Method of Producing Nonaqueous Electrolyte Secondary Battery>

Nonaqueous secondary batteries were produced by an assembly method provided below, using a cathode and an anode provided below and using the laminated, bodies produced in Examples 5 and 6 and Comparative Example 5 as nonaqueous secondary battery separators.

(Cathode)

A commercially available cathode which was produced by applying $LiNi_{0.5}Mn_{0.3}Co_{0.2}O_2$/conductive material/PVDF (weight ratio 92/5/3) to an aluminum foil was used. The aluminum foil of the cathode was cut so that a portion of the cathode where a cathode active material layer was formed had a size of 40 mm×35 mm and a portion where the cathode active material layer was not formed, with a width of 13 mm, remained around that portion. The cathode active material layer had a thickness of 58 μm and density of 2.50 g/cm$^3$.

(Anode)

A commercially available anode produced by applying graphite/styrene-1,3-butadiene copolymer/carboxy methyl cellulose sodium (weight ratio 98/1/1) to a copper foil was used. The copper foil of the anode was cut so that a portion of the anode where an anode active material layer was formed had a size of 50 mm×40 mm, and a portion where the anode active material layer was not formed, with a width of 13 mm, remained around that portion. The anode active material layer had a thickness of 49 μm and density of 1.40 g/cm$^3$.

(Assembly Method)

In a laminate pouch, the cathode, the nonaqueous secondary battery separator (laminated body), and the anode were laminated (provided) in this order so as to obtain a nonaqueous electrolyte secondary battery member. In this case, the cathode and the anode were positioned so that a whole of a main surface of the cathode active material layer of the cathode was included in a range of a main surface (overlapped the main surface) of the anode active material layer of the anode. Note that the nonaqueous secondary battery separator was prepared by cutting out a rectangular piece with a size of 5.5 cm by 4.0 cm from each of the laminated bodies obtained in Examples 5 and 6 and Comparative Example 5.

Subsequently, the nonaqueous electrolyte secondary battery member was put in a bag made by laminating an aluminum layer and a heat seal layer, and 0.20 ml of a nonaqueous electrolyte solution was poured into the bag. The nonaqueous electrolyte solution was an electrolyte solution at 25° C. obtained by dissolving 1.0 mol/L $LiPF_6$ in a mixed solvent of ethyl methyl carbonate, diethyl carbonate, and ethylene carbonate in a volume ratio of 50:20:30. The bag was heat-sealed while a pressure inside the bag was reduced, so that a nonaqueous secondary battery was produced.

[Battery Storage Stability Test Method]

A new nonaqueous secondary battery which had been produced by the method provided above and had not been subjected to any cycle of charge/discharge was subjected to 4 cycles of initial charge/discharge. Each cycle of the initial charge/discharge was performed under conditions that the temperature was 25° C., the voltage range was 4.1 to 2.7 V, and the current value was 0.2 C (1C is defined as a value of a current at which a rated capacity based on a discharge capacity at 1 hour rate is discharged for 1 hour. The same is applied hereinafter).

Subsequently, charging was performed at 55° C. with a constant current which was a charge current value of 1 C and with a voltage of 4.2 V. After the voltage reached a 4.2-V charged state, a storage test was conducted for 1 week while the voltage was kept 4.2 V. A total amount of currents of lower than 0.02 C which were detected during the storage test was calculated as a "total cumulative amount of currents consumed due to degradation" (mAh). When a calculated "total cumulative amount of currents consumed due to degradation" is large, it means that a large amount of currents was consumed for degradation, of an electrolyte, etc. during the storage. Therefore, when the "total cumulative amount of currents consumed due to degradation" is small, it means that a nonaqueous secondary battery of interest has excellent battery storage stability. The calculated values of the "total cumulative amount of currents consumed due to degradation" are shown in Table 2.

Example 5

An NMP solution (manufactured by Kureha Corporation; product name "L#9305"; weight-average molecular weight of 1,000,000) containing a PVDF-based resin (polyvinylidene fluoride-hexafluoropropylene copolymer) was prepared as a coating solution. The coating solution was applied to a polyethylene porous film (thickness 12 μm, porosity 44%) through a doctor blade method so as to weigh 1.0 g per square meter of PVDF-based resin in the coating solution. An applied material obtained was immersed in 2-propanol while the coating film remained wet with NMP, and then was allowed to stand at −25° C. for 5 minutes, so that a deposited porous film (9-i) was obtained. While the deposited porous film (9-i) thus obtained was in an immersion solvent wet state, the deposited porous film (9-i) was further immersed in another 2-propanol, and then was allowed to stand at 25° C. for 5 minutes, so that a deposited porous film (9-ii) was obtained. The deposited porous film (9-ii) thus obtained was dried at 30° C. for 5 minutes, so that a laminated body (9) including a porous layer was obtained. The result of battery storage stability evaluation performed on the laminated body (9) thus obtained is shown in Table 2.

Example 6

An applied material obtained through a method similar to that employed in Example 5 was immersed in 2-propanol while the coating film remained wet with NMP, and then, was allowed to stand at 0° C. for 5 minutes, so that a deposited porous film (10-i) was obtained. While the deposited porous film (10-i) thus obtained was in an immersion solvent wet state, the deposited porous film (10-i) was further immersed in another 2-propanol, and then was allowed to stand at 25° C. for 5 minutes, so that a deposited porous film (10-ii) was obtained. The deposited porous film (10-ii) thus obtained was dried at 30° C. for 5 minutes, so that a laminated body (10) including a porous layer was obtained. The result of battery storage stability evaluation performed on the laminated body (10) thus obtained is shown in Table 2.

Comparative Example 5

An applied material obtained through a method similar to that employed in Example 5 was immersed in 2-propanol while the coating film remained wet with NMP, and then was allowed to stand at 5° C. for 5 minutes, so that a deposited porous film (11-i) was obtained. While the deposited porous film (11-i) thus obtained was in an immersion solvent wet state, the deposited porous film (11-i) was further immersed in another 2-propanol, and then was allowed to stand at 25° C. for 5 minutes, so that a deposited porous film (11-ii) was obtained. The deposited porous film (11-ii) thus obtained was dried at 30° C. for 5 minutes, so that a laminated body (11) including a porous layer was obtained. The result of battery storage stability evaluation performed on the laminated body (11) thus obtained is shown in Table 2.

TABLE 2

|  | α ratio [mol %] | Total cumulative amount of currents consumed due to degradation [mAh] |
|---|---|---|
| Example 5 | 29 | 0.58 |
| Example 6 | 63 | 0.51 |
| Comparative Example 5 | 67 | 3.69 |

[Result]

It was shown that nonaqueous secondary batteries which include, as a separator, each of the laminated bodies (9) and (10) produced in Examples 5 and 6, respectively, wherein a porous layer included in each of the laminated bodies contains a PVDF-based resin including crystal form α and crystal form β and having a crystal form α content (α ratio) of not less than 10 mol % and not more than 65 mol %, have more excellent battery storage stability than a nonaqueous secondary battery which includes, as a separator, the laminated body (11) produced in Comparative Example 5, wherein a porous layer included in the laminated body contains a PVDF-based resin including crystal form α and crystal form β and having a crystal form α content (α ratio) falling outside the above range (67%).

Therefore, it was shown that a laminated body that includes a porous layer containing a PVDF-based resin including crystal form α and crystal form β, wherein a crystal form α content (α ratio) of the PVDF-based resin is not less than 10 mol % and not more than 65 mol %, is further preferable as a separator in a nonaqueous secondary battery having battery storage stability.

INDUSTRIAL APPLICABILITY

A porous layer in accordance with the present invention is suitably applicable to production of a nonaqueous secondary battery having a shutdown function. Therefore, a laminated body in accordance with the present invention may be used broadly in the field of production of a nonaqueous secondary battery.

The invention claimed is:
1. A porous layer, comprising:
a polyvinylidene fluoride-based resin,
wherein, assuming that a sum of individual amounts of crystal form α and crystal form β contained in the polyvinylidene fluoride-based resin is 100 mol %, the amount of crystal form α contained in the polyvinylidene fluoride-based resin is not less than 10 mol % and not more than 60 mol %, wherein the amount of crystal form α is calculated from an absorption intensity at around 765 $cm^{-1}$ in an IR spectrum of the porous layer, while the amount of crystal form β is calculated from an absorption intensity at around 840 $cm^{-1}$ in the IR spectrum of the porous layer, and
wherein the amount of crystal form α (α ratio) is calculated by the following equation (4a):

$$\alpha \text{ ratio } (\%) = [1 - \{\text{absorption intensity at 840 } cm^{-1}/(\text{absorption intensity at 765 } cm^{-1} \times \text{correction factor } (1.681) + \text{absorption intensity at 840 } cm^{-1})\}] \times 100 \quad (4a).$$

2. The porous layer according to claim 1, wherein the polyvinylidene fluoride-based resin is (i) a homopolymer of vinylidene fluoride and/or (ii) a copolymer of vinylidene fluoride and at least one monomer selected from the group consisting of hexafluoropropylene, tetrafluoroethylene, trifluoroethylene, trichloroethylene, and vinyl fluoride.

3. The porous layer according to claim 1, wherein the polyvinylidene fluoride-based resin has a weight-average molecular weight of not less than 300,000 and not more than 3,000,000.

4. The porous layer according to claim 1, further comprising:
   a filler which accounts for not less than 1% by mass and not more than 30% by mass of a sum of individual amounts of the polyvinylidene fluoride-based resin and the filler.

5. The porous layer according to claim 4, wherein the filler has a volume average particle size of not less than 0.01 µm and not more than 10 µm.

6. A laminated body, comprising:
   a porous base material containing 50% or more by volume of a polyolefin-based resin; and
   a porous layer according to claim 1, the porous layer being laminated on at least one surface of the porous base material.

7. A separator for a nonaqueous electrolyte secondary battery, comprising:
   a porous base material containing 50% or more by volume of a polyolefin-based resin; and
   a porous layer according to claim 1, the porous layer being laminated on at least one surface of the porous base material.

8. A member for a nonaqueous electrolyte secondary battery, the member comprising in sequence:
   a cathode;
   a porous layer according to claim 1; and
   an anode.

9. A nonaqueous electrolyte secondary battery comprising:
   a porous layer according to claim 1.

* * * * *